(12) United States Patent
Hsiao

(10) Patent No.: US 6,991,477 B1
(45) Date of Patent: Jan. 31, 2006

(54) CONNECTOR OF A CARD READER

(75) Inventor: Wen-Hsiang Hsiao, Taipei (TW)

(73) Assignee: WEM Technology Inc., Taipei (TW)

( * ) Notice: Subject to any disclaimer, the term of this patent is extended or adjusted under 35 U.S.C. 154(b) by 0 days.

(21) Appl. No.: 10/994,274

(22) Filed: Nov. 23, 2004

(51) Int. Cl.
*H01R 13/648* (2006.01)

(52) U.S. Cl. ....................................................... 439/92

(58) Field of Classification Search ................ 439/607, 439/181, 92
See application file for complete search history.

(56) References Cited

U.S. PATENT DOCUMENTS

| | | | |
|---|---|---|---|
| 5,154,629 A * | 10/1992 | Carver et al. ................ | 439/607 |
| 6,299,482 B1 * | 10/2001 | Huang .......................... | 439/607 |
| 6,709,291 B1 * | 3/2004 | Wallace et al. .............. | 439/607 |
| 6,840,817 B2 * | 1/2005 | Chen .......................... | 439/620 |

* cited by examiner

*Primary Examiner*—Tho D. Ta
(74) *Attorney, Agent, or Firm*—Bacon & Thomas, PLLC

(57) ABSTRACT

An improved connector of a card reader, the card reader includes a circuit board in a housing as its principal unit; the circuit board has a USB connecting port to make circuit connection with a set of electric equipment, and is provided at least with one aforesaid connector for insertion of a memory card. Wherein: the main body of the connector is integrally made by injection molding purely of plastic, and a grounding electric circuit of the connector is connected to a metallic housing of a USB connecting port to form circuit continuation of the metallic housing of the USB connecting port and the electric equipment, and to effectively prevent static-electricity damage. Because the main body of the connector is made by injection molding purely of plastic, this can largely lower the cost of production of the connector.

3 Claims, 3 Drawing Sheets

CONNECTOR OF A CARD READER

BACKGROUND OF THE INVENTION

1. Field of the Invention

The present invention is related to grounding of a connector of a card reader, and especially to an improved connector of which a main body is integrally made by injection molding purely of plastic, and of which a grounding electric circuit is connected to a USB connecting port to effectively avoid external static-electricity interference against the electric elements of the card reader.

2. Description of the Prior Art

As shown in FIG. 1 which is a perspective schematic view of the internal structure of a conventional card reader, it is shown that the whole card reader 10 includes a circuit board 12 in a housing 11 as a principal unit. The circuit board 12 is provided with a USB connecting port to be connected with a circuit of a set of electric equipment (not shown) to form circuit connecting of the card reader 10 with the electric equipment, and to supply power for operation of the card reader 10.

The circuit board 12 is provided at least with a connector 14 for insertion of a memory card, the entire card reader 10 also is provided on the circuit board 12 with electric elements such as an integrated circuit 15 to control operation of the card reader 10, and further to form circuit connection of the memory card with the electric equipment.

And more, an inserting portion of each connector 14 of a card reader 10 generally is allocated on the front side of the housing 11 in favor of inserting and drawing out for changing a memory card, and the front side of the housing 11 is provided with an opening for passing of the memory card therethrough, thereby the memory card can get in the card reader 10 to surely insert in and connect with the connector 14. However, the housing 11 with the opening for passing therethrough the memory card will also form an area losing shielding for the housing 11, and is subjected to direct incidence of external static electricity onto the circuit board 12 in the housing 11 through the opening, this will induce damage against the internal electric elements such as the integrated circuit 15, and even on the contrary make destruction against the memory card by electro-static discharging (ESD) of the internal electric elements such as the integrated circuit 15. Therefore, the connector applied on a portable device such as the card reader 10 especially needs increased ability of anti-ESD.

Conventional anti-ESD techniques used on such a card reader 10 mainly have the connector 14 covered thereover with a metallic shielding layer 20, and the metallic shielding layer 20 further is connected with passive elements such as electric induction and protecting diodes etc. against static discharging to improve the ability of anti-ESD. However, the main body of the connector 14 mainly is made by injection molding of plastic, while the metallic shielding layer 20 is made of metal by punching process, hence the entire connector 14 has to be completed by respectively finishing productions of semi-finished articles including the main body and the metallic shielding layer 20 by using different techniques and equipment, which semi-finished articles then are assembled to connect the metallic shielding layer 20 with the main body of the connector 14; in this way, not only the cost of production of the connector is increased, but the yield of production of such connectors still can not be effectively increased.

Particularly, with a limited space of the card reader 10, for the sake of improving the function of anti-ESD, additional passive elements such as electric induction and protecting diodes etc. against static discharging must be allocated on the extremely small circuit board 12, these elements not only occupy much space on the circuit board 12, but also lower the flexibility of designing of related circuits.

SUMMARY OF THE INVENTION

As to the improved connector of a card reader of the present invention, the card reader also includes a circuit board in a housing as its principal unit. The circuit board is provided with a USB connecting port to make circuit connection with a set of electric equipment; and the circuit board is provided at least with a connector for insertion of a memory card. The key point is that: the main body of the connector is integrally made by injection molding purely of plastic to form a structural member having an inserting portion and a shielding plate, the grounding electric circuit of the connector is connected to a metallic housing of a USB connecting port to form continuation of the electric circuit of the metallic housing of the USB connecting port and the electric equipment, and to effectively prevent static-electricity damage.

The main body of the connector can be made solely by injection molding of plastic in a set of shaping equipment, this can save the operation of assembling with a metallic shielding layer, and can largely lower the cost of production of the connector, and also effectively increases the yield of production of such connectors.

The present invention will be apparent in its structural combination and the entire mode of operation thereof after reading the detailed description of the preferred embodiment thereof in reference to the accompanying drawings.

DETAILED DESCRIPTION OF THE PREFERRED EMBODIMENT

Figure 1:
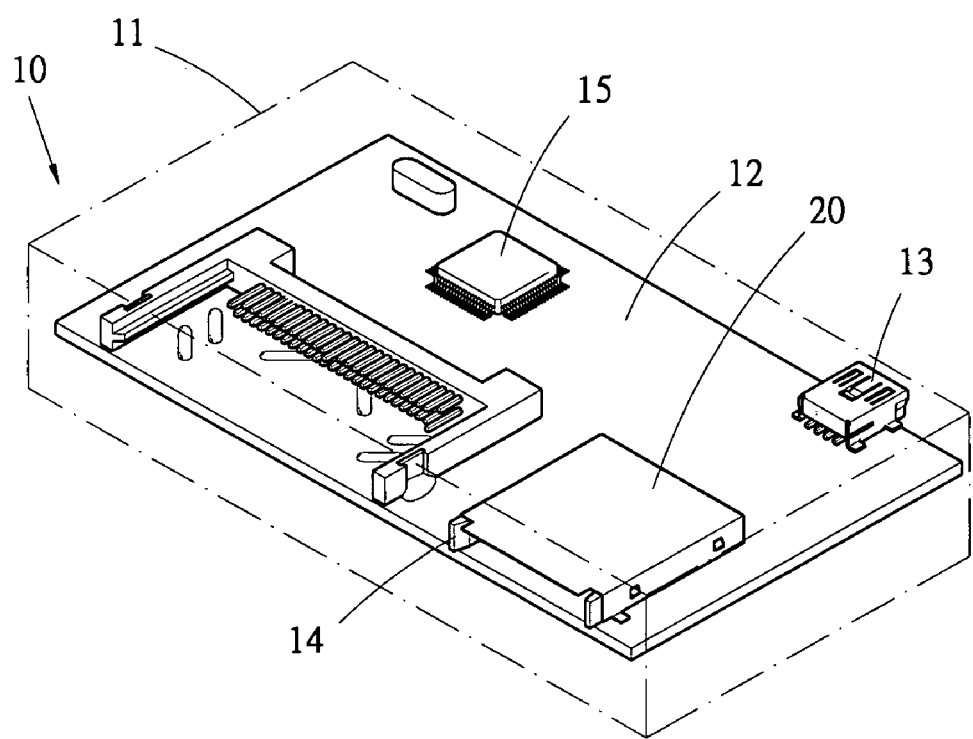
FIG. 1 is a perspective schematic view showing the internal structure of a conventional card reader.
Figure 2:
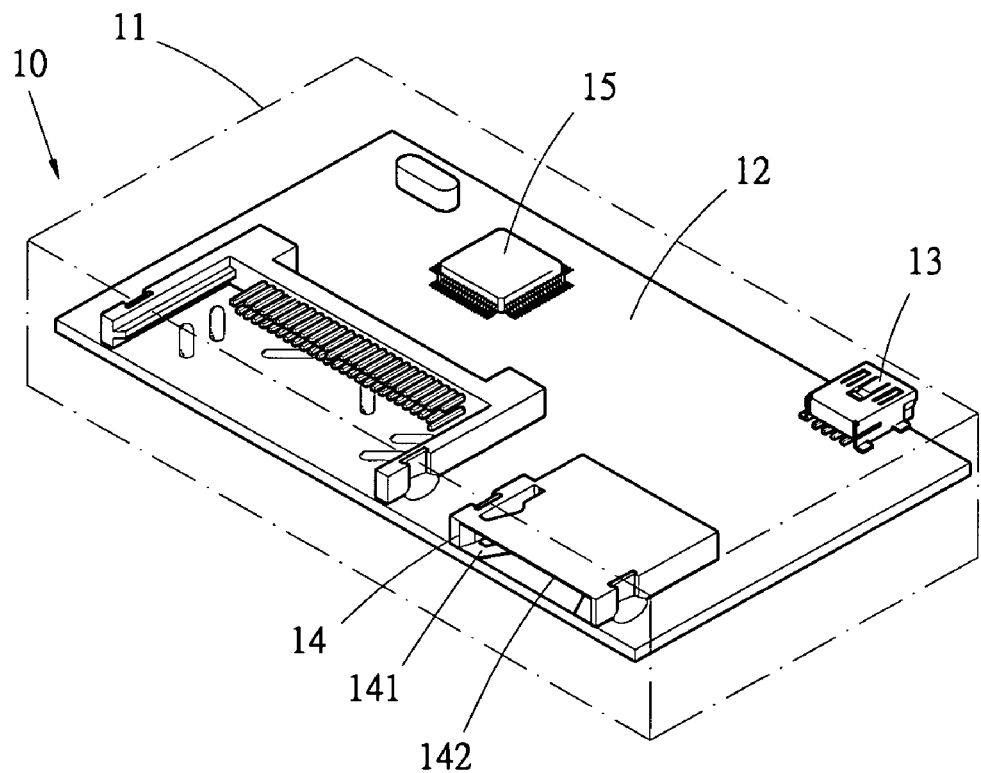
FIG. 2 is a perspective schematic view showing the internal structure of a card reader of the present invention.
Figure 3:
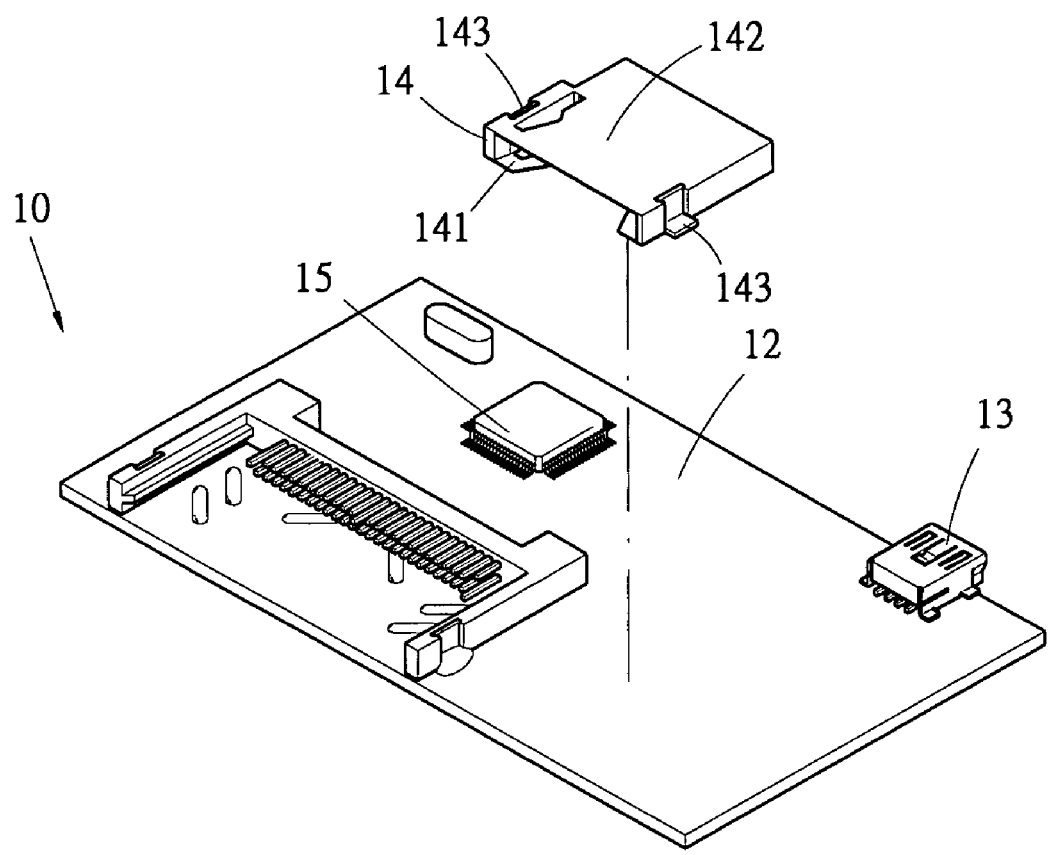
FIG. 3 is an anatomic perspective schematic view showing a connector and a circuit board of the card reader of the present invention.

In the improved connector in a card reader 10 of the present invention, the structure of the card reader 10 is as shown in FIGS. 2 and 3, and also has a circuit board 12 in a housing 11 as a principal unit; the circuit board 12 is provided with a USB connecting port 13 to make connection with a set of electric equipment using the card reader 10, thereby the card reader 10 can make circuit connection with the electric equipment to supply electric power for the card reader 10. In the same mode, the circuit board 12 is provided at least with one of the aforesaid connector 14 for insertion and drawing out of a memory card, and the circuit board 12 is provided thereon with electric elements such as an integrated circuit 15 to control operation of the card reader 10, and further to form circuit connection of the memory card with the electric equipment.

The front side of the housing 11 is provided, in mating with an inserting portion of the connector 14, with an opening for passing of a memory card therethrough. Thereby, the memory card can get in the card reader 10 to connect by insertion with the connector 14; in this mode, insertion and drawing out of the memory card is convenient.

The key point of the present invention is that: the main body of the connector 14 is designed to be integrally made by injection molding purely of plastic to form a structural member having an inserting portion 141 and a shielding plate 142, the grounding electric circuit of the connector 14 is connected to a metallic housing of a USB connecting port 13 (the connection can be made directly connecting a printed circuit of the circuit board 12 with the metallic housing of the USB connecting port 13); thereby, by continuation of the metallic housing of the USB connecting port 13 and the grounding electric circuit of the electric equipment, the improved connector to effectively prevent static-electricity interference can be obtained, thus electro-static discharging (ESD) can be improved.

The main body of the entire connector 14 can be integrally made solely by injection molding of plastic in a set of shaping equipment, thereby avoiding the operation of assembling with a metallic shielding layer, and largely lowering the cost of production of the connector, and also effectively increasing the yield of production of such connectors. The connector 14 can be provided, on the periphery of the inserting portion 141 for insertion of a memory card, with metallic pin-boards (mounting pins) 143 connecting with the circuit board 12 The connector 14 can thus be connected with the circuit board 12, and this can help to increase the function of anti-ESD.

According, the present invention has provided an improved connector for improving grounding. The description for practicing and drawings are only for illustrating a preferred embodiment of the present invention, and not for giving any limitation to the scope of the present invention. It will be apparent to those skilled in this art that various equivalent modifications or changes of this invention shall also fall within the scope of the appended claims of the present invention.

I claim:

1. An improved connector of a card reader, said card reader including a circuit board in a housing as its principal unit, said circuit board being provided with a USB connecting port to make circuit connection with a set of electric equipment, and said card reader having on said circuit board at least one said connector for insertion of a memory card, each said connector comprising:
    a main body integrally made by injection molding of plastic to form a structural member having a plastic inserting portion and a plastic shielding plate; and
    at least one metallic mounting pin provided on the periphery of said inserting portion connectable with said circuit board;
    whereby connection of a grounding electric circuit of said connector to a metallic housing of said USB connecting port is enabled.

2. The improved connector of a card reader as in claim 1, wherein said circuit board is provided further with at least an integrated circuit.

3. The improved connector of a card reader as in claim 1, wherein said grounding electric circuit of said connector is connected to said metallic housing of said USB connecting port directly via a printed circuit of said circuit board.

* * * * *